US010859036B2

(12) United States Patent
Morgan et al.

(10) Patent No.: US 10,859,036 B2
(45) Date of Patent: Dec. 8, 2020

(54) ACTUATOR FOR USE IN AIRCRAFT

(71) Applicant: Goodrich Actuation Systems Limited, Solihull (GB)

(72) Inventors: Antony Morgan, Wolverhampton (GB); Andrew Hawksworth, Moreton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 208 days.

(21) Appl. No.: 16/016,817

(22) Filed: Jun. 25, 2018

(65) Prior Publication Data
US 2019/0017469 A1 Jan. 17, 2019

(30) Foreign Application Priority Data

Jul. 13, 2017 (EP) .................................. 17275105

(51) Int. Cl.
| F02K 1/76 | (2006.01) |
| F16H 25/20 | (2006.01) |
| B64D 33/04 | (2006.01) |
| F02K 1/70 | (2006.01) |
| F15B 15/02 | (2006.01) |
| F15B 15/26 | (2006.01) |
| F15B 21/00 | (2006.01) |
| F15B 21/14 | (2006.01) |

(52) U.S. Cl.
CPC .............. *F02K 1/763* (2013.01); *B64D 33/04* (2013.01); *F02K 1/70* (2013.01); *F02K 1/766* (2013.01); *F15B 15/02* (2013.01); *F15B 15/26* (2013.01); *F15B 21/008* (2013.01); *F15B 21/14* (2013.01); *F16H 25/20* (2013.01); *F05D 2220/323* (2013.01); *F05D 2260/52* (2013.01); *F05D 2260/96* (2013.01); *F05D 2270/64* (2013.01)

(58) Field of Classification Search
CPC . F01K 1/70; F01K 1/763; F01K 1/766; B64D 33/04; F15B 15/02; F15B 15/26; F15B 21/004; F15B 21/14; F05D 2220/323; F05D 2260/96; F05D 2270/64
See application file for complete search history.

(56) References Cited

U.S. PATENT DOCUMENTS

| 3,203,269 A | | 8/1965 | Perrine | |
| 3,614,912 A | * | 10/1971 | Nepp | .................... F15B 15/261 |
| | | | | 92/25 |
| 4,754,694 A | * | 7/1988 | Martin | ..................... F02K 1/76 |
| | | | | 92/14 |

(Continued)

FOREIGN PATENT DOCUMENTS

EP 3228853 A1 10/2017

OTHER PUBLICATIONS

Extended European Search Report for International Application No. 17275105.9 dated Feb. 5, 2018, 8 pages.

*Primary Examiner* — Carlos A Rivera
(74) *Attorney, Agent, or Firm* — Cantor Colburn LLP

(57) ABSTRACT

There is provided an actuator for an aircraft thrust reverser, comprising a first member, a second member movable relative to the first member, a third member movable relative to the first member and the second member, and a lock system configured to selectively lock the second member to the third member in a first stage of actuation, and the first member to the second member in a second, separate stage of actuation.

13 Claims, 4 Drawing Sheets

(56) References Cited

U.S. PATENT DOCUMENTS

| | | | |
|---|---|---|---|
| 5,775,639 A | 7/1998 | Fage | |
| 6,494,033 B1 * | 12/2002 | Davies | F02K 1/76 188/162 |
| 7,146,796 B2 | 12/2006 | Lair | |
| 2005/0040284 A1 * | 2/2005 | Christensen | F02K 1/763 244/101 |
| 2012/0067024 A1 * | 3/2012 | Vauchel | F02K 1/72 60/226.2 |
| 2012/0137654 A1 * | 6/2012 | Burgess | F02K 1/06 60/204 |
| 2013/0205753 A1 | 8/2013 | Todorovic | |
| 2014/0245743 A1 * | 9/2014 | Caruel | F02K 1/625 60/771 |
| 2015/0267641 A1 | 9/2015 | Gormley | |

\* cited by examiner

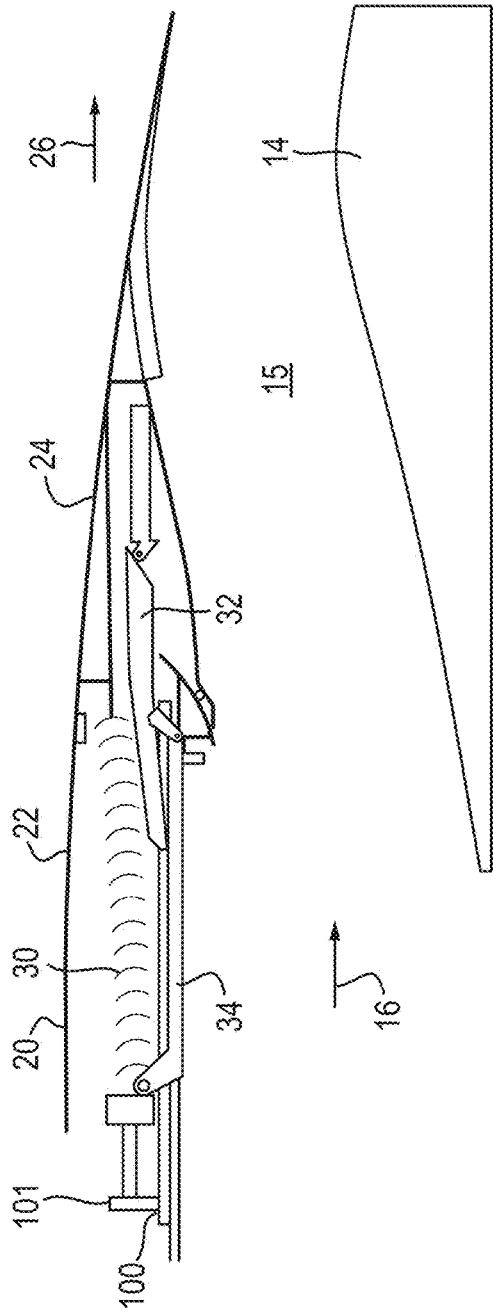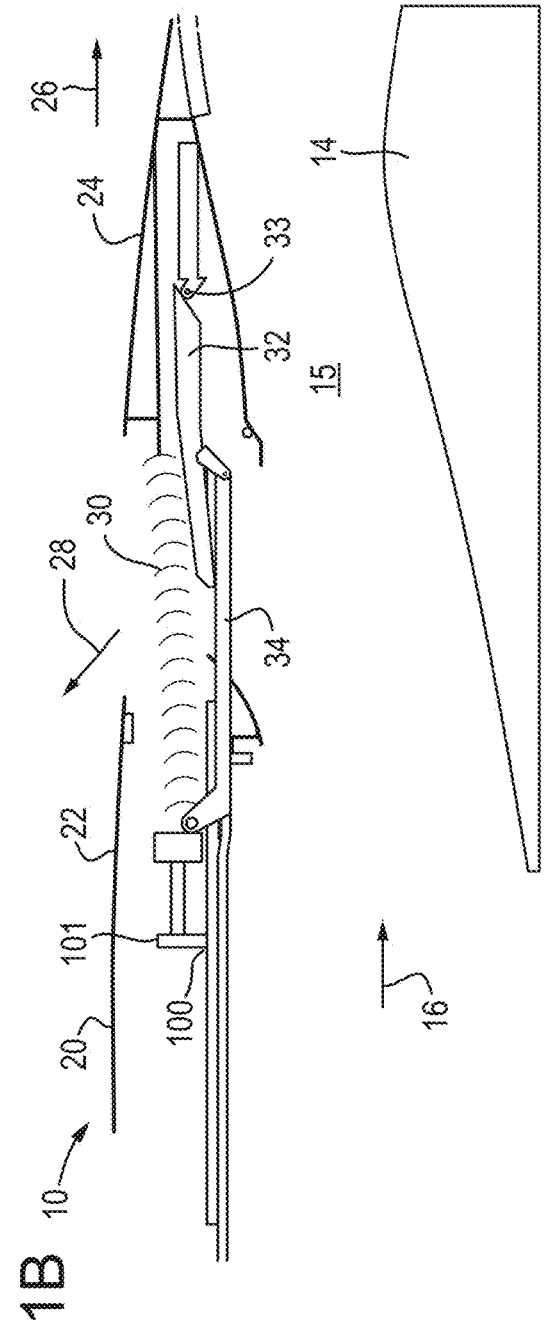

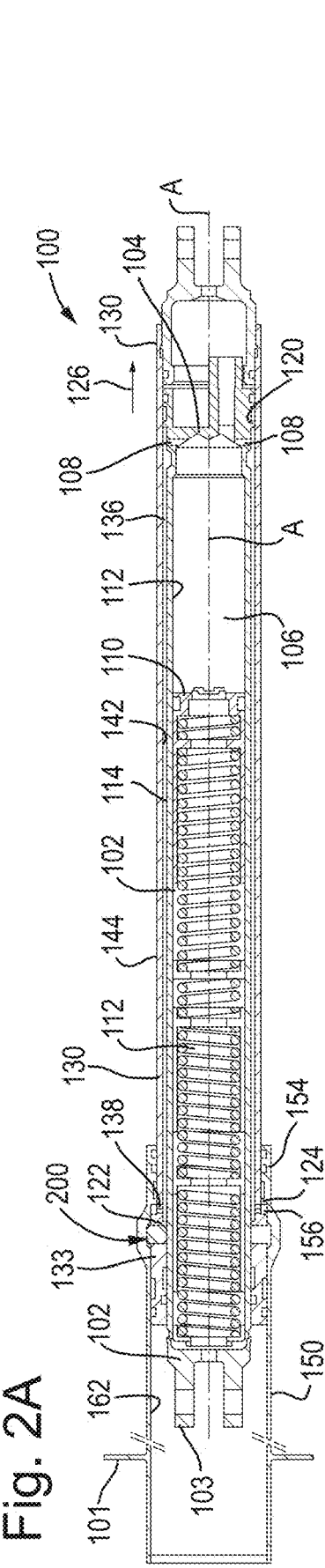
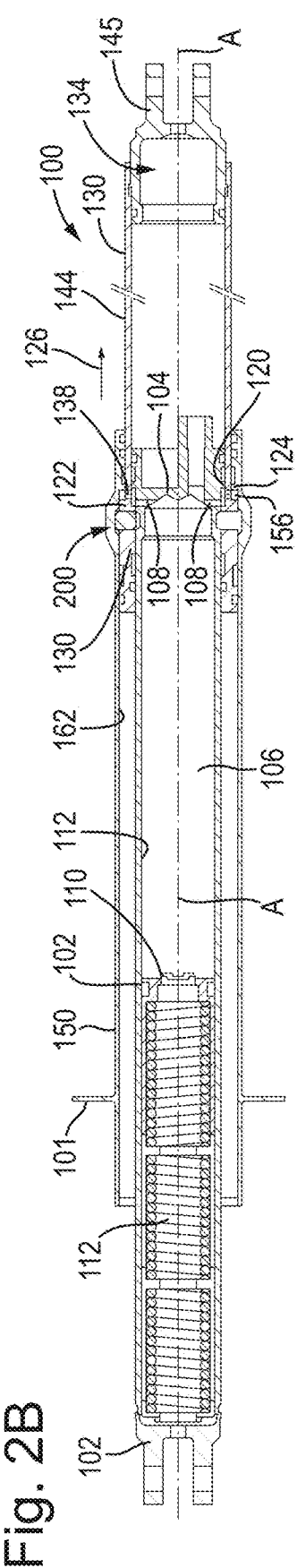
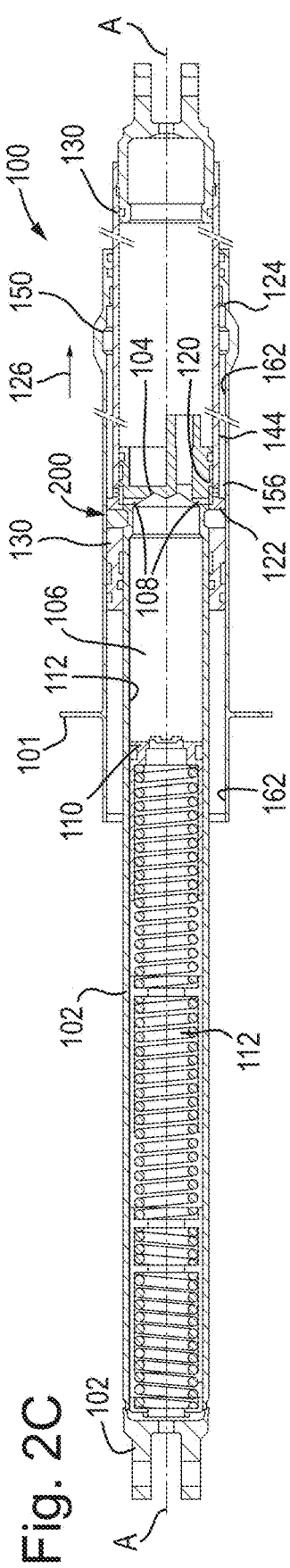

ACTUATOR FOR USE IN AIRCRAFT

FOREIGN PRIORITY

This application claims priority to European Patent Application No. 17275105.9 filed Jul. 13, 2017, the entire contents of which is incorporated herein by reference.

FIELD

The present disclosure relates generally to an actuator for use in an aircraft, for example a thrust reverser actuation system ("TRAS") or a Variable Area Fan Nozzle ("VAFN"). More specifically, the present disclosure provides a multi-stage actuation system in which a single input drive is used to provide a two-stage output, wherein a hydraulic system may also reduce vibrations or "flutter" in the actuator components and/or provides a variable driving force in each stage of actuation.

BACKGROUND

Thrust reversers are provided on jet engines typically to increase the amount of braking on an aircraft upon landing. When deployed, a thrust reverser will change the direction of thrust of the jet engine such that some or all of the thrust is directed forwards, which acts to slow the aircraft so that it can then taxi off the runway.

There are a number of types of thrust reverser, all of which must be stowed during normal aircraft operation, for example so that the thrust reverser cannot be deployed during take-off or at a cruise altitude and can only be deployed during landing. The most common type of thrust reverser is a "cascade-type" thrust reverser, in which an actuator moves one or more movable components including a translating cowl, which exposes a plurality of cascade vanes to the primary flow (e.g., bypass flow) of an engine. At the same time, a blocker door may move to block the primary flow and assist in diverting the airflow through the cascade vanes. Upon exposure to the cascade vanes, the primary flow will be diverted at least partially forwards, which acts to slow the aircraft as described above.

Developments in thrust reverser actuation systems include attempting to hide blocker doors from the primary flow as much as possible during normal operation. For example, blocker doors may be hidden until a defined movement of a thrust reverser sleeve that fully exposes the cascade vanes, after which the blocker doors can be deployed to divert the primary flow through the vanes.

It is desired to improve the actuators used such thrust reverser and other systems in an aircraft.

SUMMARY

In accordance with an aspect of the disclosure, there is provided an actuator for an aircraft thrust reverser, comprising a first member, a second member movable relative to the first member, and a third member movable relative to the first member and the second member. The actuator further comprises a lock system configured to selectively lock the second member to the third member in a first stage of actuation, and the first member to the second member in a second, separate stage of actuation.

This arrangement provides an actuator that is able to provide two stages of output, by combining a lock member with first, second and third members as described above.

In the first stage of actuation the second member and the third member may be locked together by the lock system, such that the second member and the third member are able to move relative to the first member.

In the second stage of actuation the first member and the second member may be locked together by the lock system, and the second member may be released from the third member, such that the third member is able to move relative to the first member and the second member.

Relative movement of the second member and/or the third member with respect to the first member in the first stage of actuation may increase the energy within a stored energy device. This build-up of energy may be used for a variety of reasons, for example to apply pressure to the second member and/or the third member, which can reduce the vibrations or "flutter" in these components.

The stored energy device may be configured to exert a force on the second member and the third member, wherein the force exerted by the stored energy device may be dependent on the position of the second member and/or the third member with respect to the first member during the first and second stages of actuation.

During the first stage of actuation the energy stored within the stored energy device may gradually increase, and during the second stage of actuation the energy within the stored energy device may gradually decrease, such that at the transition between the first stage of actuation and the second stage of actuation the energy within the stored energy device is at a maximum value. This can provide a defined point at which the energy within the stored energy device is at a maximum value, meaning that a design incorporating the actuator can be tailored to provide a maximum energy output from the stored energy device at the transition.

The stored energy device may comprises a resilient member. During the first stage of actuation the resilient member may be compressed to increase the energy within the resilient member, and during the second stage of actuation the resilient member may be decompressed to decrease the energy within the resilient member.

The first member may comprise a first fluid chamber and may be configured such that an increase in fluid pressure within the first fluid chamber increases the energy within the stored energy device. The first fluid chamber may be a cavity or chamber within the first member. The second member may comprise a second fluid chamber in fluid communication with the first fluid chamber. The second fluid chamber may be formed between the first member and the second member, for example the second fluid chamber may be an annular cavity or chamber around the first member. During the first stage of actuation relative movement of the second member with respect to the first member may force fluid from the second fluid chamber into the first fluid chamber to increase the energy within the stored energy device.

The third member may comprise a third fluid chamber. The third fluid chamber may be formed between the second member and the third member, for example the third fluid chamber may be an annular cavity or chamber around the second member. During the second stage of actuation movement of the third member relative to the first and second members may cause fluid to be conveyed from the first fluid chamber to the third fluid chamber (e.g., the fluid may be forced into the third fluid chamber by the stored energy device) to decrease the energy within the stored energy device.

At a transition between the first stage of actuation and the second stage of actuation there may be a maximum volume of fluid within the first fluid chamber, so as to maximise the force exerted by the stored energy device at the transition.

The actuator may further comprise a lubricating fluid held within and transferred between the first fluid chamber, second fluid chamber and third fluid chamber during the first and second stages of actuation, wherein the lubricating fluid is configured to lubricate the first member, the second member and the third member.

The second fluid chamber may comprise an outer surface of the first member, such that lubricating fluid within the first fluid chamber is configured to lubricate the outer surface of the first member along which the second member slides. The third fluid chamber may comprise an outer surface of the second member, such that lubricating fluid within the third fluid chamber is configured to lubricate the outer surface of the second member along which the third member slides.

The lubricating fluid (e.g., oil) may be transferred between the first fluid chamber and the second and third fluid chambers, which transfer of fluid may also cause the build-up of energy within the stored energy device as described above. This can provide the dual function of reducing vibrations at the transition between the first and second stages of actuation whilst lubricating the members as they move relative to each other.

The actuator may comprise a further actuator that is configured to drive the third member in a direction of actuation throughout the first stage of actuation and a second stage of actuation. The further actuator may be a linear actuator and may control the position of the third member. In other words, in various embodiments the axial position of the third member is dictated by the further actuator configured to drive it.

Although in some embodiments the stored energy device is configured to provide a force to the third member in the axial direction, this is typically provided to reduce the freedom of movement of the third member and components connected to it, rather than provide an additional driving force. However, in some embodiments the build-up of energy may also be used to assist in moving or driving the third member in the second stage of actuation.

In accordance with an aspect of the disclosure, there is provided an aircraft thrust reverser comprising an actuator as described above, wherein the actuator is configured to control deployment of the thrust reverser.

In accordance with an aspect of the disclosure, there is provided an aircraft thrust reverser comprising a set of cascade vanes, a translating cowl and a blocker door, wherein the actuator described above may be configured or used to translate the translating cowl to expose the cascade vanes to an airflow during the first stage of actuation, and then move the blocker door into the path of the airflow during the second stage of actuation.

At a transition between the first stage of actuation and the second stage of actuation the blocker door may begin to move into the path of the airflow.

In accordance with an aspect of the disclosure, there is provided a method of operating an actuator for a thrust reverser, comprising: providing a stationary member and two moving members, wherein the moving members are located concentrically around the stationary member and are movable relative to each other and the stationary member; providing a lock system configured to lock the moving members to each other in a first stage of actuation, and then to lock one of the moving members to the stationary member, and unlock the moving members from each other in a second, separate stage of actuation; driving the moving members relative to the stationary member in the first stage of actuation; and then driving the other of the moving members relative to the second member and the stationary member in the second stage of actuation.

The actuator may be an actuator as described in any of the aspects or embodiments described above and herein. In these embodiments, the two moving members correspond to the first and third members, and the stationary member corresponds to the first member.

BRIEF DESCRIPTION OF THE DRAWINGS

Various embodiments will now be described, by way of example only, and with reference to the accompanying drawings in which:

FIGS. 1A-1D show an aircraft thrust reverser and sequentially the movement of the various components of the thrust reverser during a deployment of the thrust reverser;

FIGS. 2A-2C show an actuator in accordance with an embodiment of the present disclosure, and how the various components move during actuation.

DETAILED DESCRIPTION

Figure 1C:
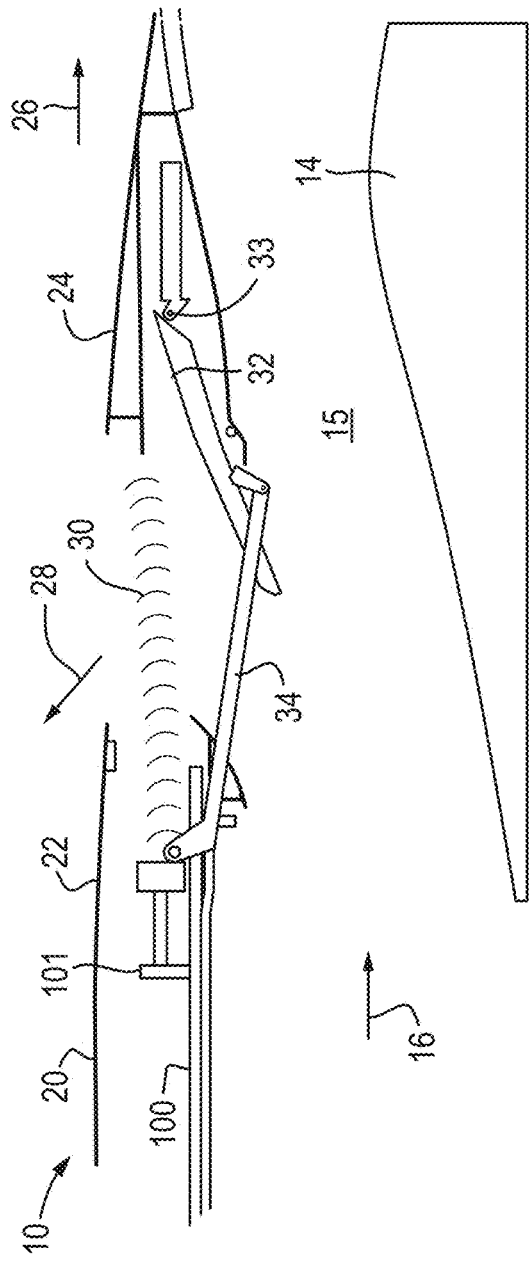

FIG. 1A schematically shows a thrust reverser apparatus 10 of a jet engine comprising an outer cowl 20 that surrounds an engine core 14. The engine core 14 may correspond to the part of the engine that houses the compressor, combustor and turbine sections of the engine. Surrounding the engine core 14 is an airflow 16, which may correspond to a primary or bypass airflow of the engine, and passes through a bypass duct 15 of the engine that leads to an exhaust duct.

The outer cowl 20 may comprise a static portion 22 and a translating portion 24 (commonly known as a "transcowl"), wherein the translating portion 24 may move relative to the static portion 22 and in an aft direction 26 of the engine.

Connected between the static portion 22 and the translating portion 24 are a number of components that are included in the thrust reverser apparatus 10 of the jet engine. These include a plurality of cascade vanes 30, a blocker door 32, an actuator 100, and a linkage 34 between the actuator 100 and the blocker door 32. The actuator 100 may comprise a mechanical driving means, as well as the features that are described in more detail below.

The sequence of movements of the thrust reverser apparatus 10 in use and upon deployment is shown in FIGS. 1A-1D.

FIG. 1A shows the stowed position of the thrust reverser apparatus 10, in which the static portion 22 and the translating portion 24 of the outer cowl 20 are connected so as to form a substantially smooth or uninterrupted surface during normal operation of the engine. Furthermore, in the stowed position the cascade vanes 30 and blocker door 32 are not exposed to the primary flow 16 of the engine. The actuator 100 has not driven any of the components and will remain inactive until it is desired to deploy the thrust reverser. The actuator 100 comprises an actuating arm 101 that is operatively connected to the linkage 34, such that movement of the actuating arm 101 drives the linkage 34, and initially in the aft direction 26.

FIG. 1B shows the apparatus 10 after a first stage of deployment of the thrust reverser. The actuating arm 101 has moved in the aft direction 26 to drive the linkage 34 in this direction. This movement also pushes the cascade vanes 30 in the aft direction 26, as well as the translating portion 24 of the outer cowl 20 and the blocker door 32. This partially exposes the cascade vanes 32 to the primary flow 16, and causes some air to be diverted in a direction 28 that is at least partially in a forward direction, i.e., relative to the direction of movement of the aircraft. However, the majority of the primary flow 16 will still pass through the bypass duct.

At this point, the blocker doors 32 are also exposed to the primary flow 16 and have been found to experience flutter or other unwanted movement that can affect the further deployment of the thrust reverser, in particular the movement of the blocker door 32 into the bypass duct 15. The actuator 100 is configured at this point (as described in more detail below) to provide a driving force in addition to the mechanical drive provided, so as to limit the effect of this flutter and ensure smooth deployment of the thrust reverser.

At the end of the first stage (as shown in FIG. 1B) the blocker door 32 stops translating in the aft direction 26, and further movement of the linkage 34 by the actuator 100 will begin to rotate the blocker door 32 about a pivot 33. The precise mechanism for this transition is known in the art, and will not be described in detail herein. Any suitable mechanism may be used.

FIG. 1C shows the apparatus 10 during a second stage of deployment of the thrust reverser. The actuator continues to push the linkage 34 in the aft direction 36. As discussed above, this now causes the blocker door 32 to rotate about the pivot 33, which introduces a large amount of aerodynamic flutter to the blocker door 32 as it is introduced into the bypass duct 15. Throughout the second stage the actuator 100 ensures that the thrust reverser, and in particular the blocker door 32, is smoothly deployed by providing an additional driving force as discussed above.

Figure 1D:
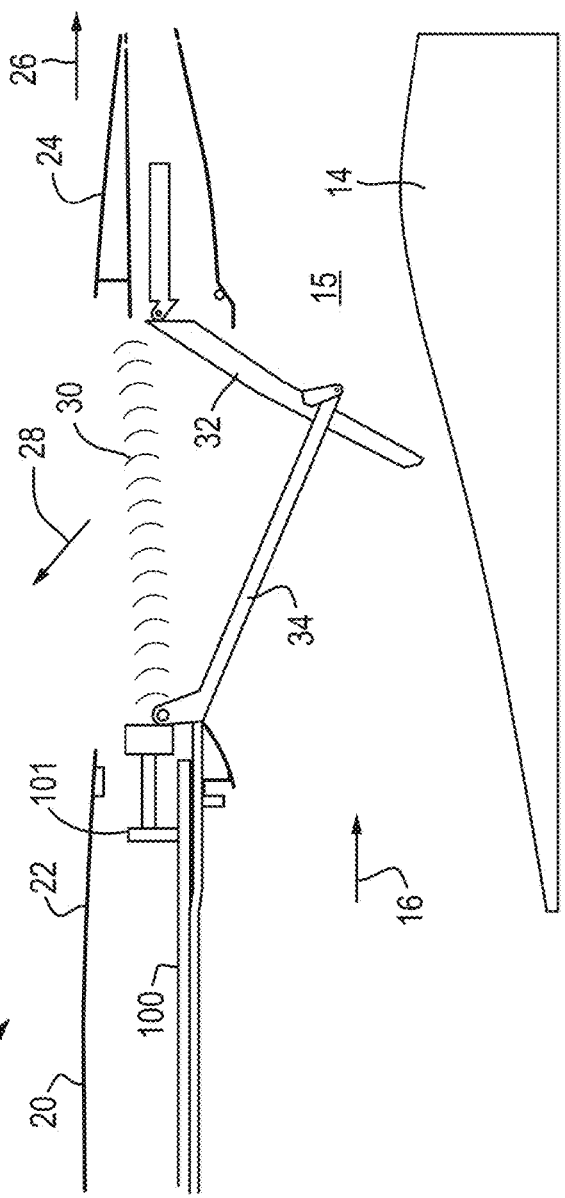

FIG. 1D shows the apparatus 10 at the end of the second stage of deployment, in which the blocker door 32 is now at a maximum extension into the bypass duct 15, and the cascade vanes 30 are positioned within the gap created between the translating portion 24 and the static portion 22 of the outer cowl 20.

The strength of the additional driving force provided during the second stage may be at a maximum immediately after the first stage is complete, as shown in FIG. 1B, and may be configured to progressively decrease throughout the second stage of deployment, as shown in FIGS. 1C and 1D.

FIGS. 2A-2C show parts of an actuator 100 that may be used in the apparatus 10 described above in more detail, and following the same sequence of movements as described above in reference to FIGS. 1A-1D. As discussed below, the actuator 100 is not limited for use in a thrust reverser, and may be used to actuate other aircraft components.

The actuator 100 comprises a first, inner member 102 that remains substantially static during operation of the thrust reverser, and may be connected to a static portion of the apparatus 10 (e.g. the static portion 22) at a proximal end 103. The actuator 100 comprises a longitudinal axis A.

The first member 102 defines an interior first chamber 106 of variable volume, as well as a piston 110 movable within the first member 102 that dictates the volume of the first chamber 106. A fluid may be contained within the first chamber 106. One or more resilient members 112 (e.g., one or more springs) are configured to bias the piston 110 in a first direction 126, which may be the actuating direction of the actuator 100, and may correspond to the aft direction 26 as shown in FIGS. 1A-1D.

The first member 102 comprises an actuator arm 101 as shown, an example of which can also be seen in FIGS. 1A-1D.

The first member 102 comprises one or more fluid passages 108 at a distal end 104 thereof, which extend radially with respect to the axis A. The piston 110 is axially movable (i.e., along the axis A) and sealed to an inner surface 112 of the first chamber 106, such that fluid may only substantially enter the first chamber 106 through the fluid passages 108. If fluid is forced to flow through the fluid passages 108 and into the first chamber 106, then the piston 110 will be forced in a direction opposite to the actuating direction 126, compressing the one or more resilient members 112.

References to "radially" herein may be taken broadly to mean that the direction referred to does not have to be at a right angle to the respective axis, but merely requires a radial component thereto. However, in various embodiments the fluid passages between the members described herein may be substantially at right angles to the respective axis, as shown in the figures.

The actuator 100 comprises a second, intermediate member 130 that is located around the first member 102 (e.g., concentrically) and is movable along the axis A relative to the first member 102. A first, static seal 120 (which may be annular) is provided on an outer surface 114 of the first member 102, and is configured to fluidly seal the distal end 104 of the first member 102 to the second member 130. A second, moving seal 122 (which may be annular) is provided at a proximal end 133 of the second member 130 and is configured to fluidly seal the proximal end 133 of the second member 130 to the outer surface 114 of the first member 102, as the second member 130 moves axially with respect to the first member 102.

An inner surface 142 of the second member 130 is spaced from the outer surface 114 of the first member 102, creating a second chamber 136 (e.g., an annular chamber) in the volume between first member 102 and the second member 130. The second chamber 136 is bound axially by the first seal 120 and the second seal 122. In use, the second chamber 136 may contain a fluid.

The second chamber 136 is in fluid communication with the fluid passages 108 (e.g., the first seal 120 may be axially aft of the fluid passages 108, in the direction of arrow 126) and the first chamber 106 of the first member 102. As such, fluid contained in the second chamber 136 may be conveyed through the fluid passages 108 into the first chamber 106 of the first member 102. Fluid may also be conveyed in reverse, i.e., from the first chamber 106 to the annular second chamber 136 through the fluid passages 108.

The second member 130 is configured to slide axially along the first member 102 during the first stage of actuation (as discussed in more detail below), and then be fixed axially with respect to the first member 102 during the second stage of actuation.

Relative movement between the first member 102 and the second member 130 (i.e., during the first stage of actuation) varies the volume of the second chamber 136, e.g., by varying the distance between the first seal 120 and the second seal 122. The second member 130 may comprise a catch 145 at its distal end 134.

The second member 130 comprises one or more fluid passages 138 at the proximal end 133, which extend radially with respect to the axis A, and extend radially through the outer surface 144 of the second member 130.

The actuator 100 comprises a third, outer member 150 that is located around the second member 130 (e.g., concentrically) and is also movable along the axis A relative to the first member 102 and also the second member 130. The second seal 122 may be configured to fluidly seal the proximal end 133 of the second member 130 to an inner surface 162 of the third member 150.

A third, moving seal 124 (which may be annular) is provided at the distal end 154 of the third member 150 and is configured to fluidly seal the distal end 154 of the third member 152 the outer surface 144 of the second member 130.

The inner surface 162 of the third member 150 is spaced from the outer surface 144 of the second member 130, creating a third chamber 156 (e.g., an annular chamber) in the volume between the second member 130 and the third member 150. The third chamber 156 is bound axially by the second seal 122 and the third seal 124. In use, the third chamber 156 may contain a fluid.

The third member 150 is configured to slide axially with the second member 130 (relative to the first member 102) during the first stage of actuation, and then slide axially relative to the second member 130 (and the first member 102) during the second stage of actuation. Relative movement between the second member 130 and the third member 150 (i.e., during the second stage of actuation) varies the volume of the third chamber 156, e.g., by varying the distance between the second seal 122 and the third seal 124.

In use, a suitable further actuator or drive member, for example a ballscrew or other type of linear actuator, is configured to drive the third member 150 in the direction of actuation 126.

The actuator 100 comprises a lock system 200 configured to control the transition between the first stage of actuation and the second stage of actuation. That is, the lock system 200 is configured to allow relative movement between the first member 102 and the second member 130 during the first stage of actuation, and prevent relative movement between the first member 102 and second member 130 during the second stage of actuation. At the same time, the lock system 200 is configured to prevent relative movement between the second member 130 and the third member 150 during the first stage of actuation, and allow relative movement between the second member 130 and the third member 150 during the second stage of actuation.

Figure 3:
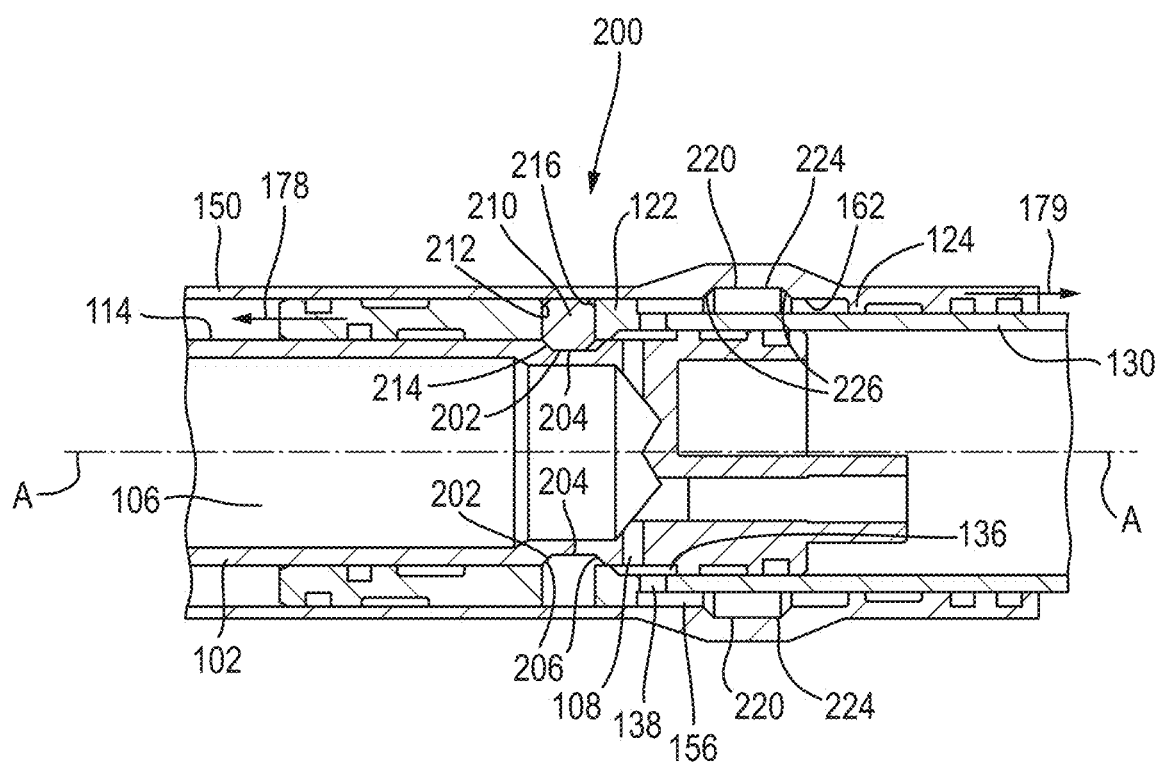
FIG. 3 shows an embodiment of a lock member for use in the actuator shown and described in respect of FIGS. 2A-2C.

FIG. 3 shows the lock system 200 in more detail and during the second stage of actuation.

The lock system 200 comprises a first cavity 202 (e.g., an annular cavity) located on the outer surface 114 of the first member 102, a movable lock member 210 located between the first member 102 and the third member 150, and a second cavity 220 (e.g., an annular cavity) located on the inner surface 162 of the third member 150.

The first cavity 202 comprises a base portion 204 and two angled side portions 206, the base portion 204 being sized so as to at least partially accommodate the lock member 210 when the lock member 210 is at the same axial position as the first cavity 202.

Similarly, the second cavity 220 comprises a base portion 224 and two angled side portions 226, the base portion 224 being sized so as to at least partially accommodate the lock member 210 when the lock member 210 is at the same axial position as the second cavity 220.

The lock member 210 itself comprises chamfered edges 212, 214 that are configured in use to contact the various angled side portions 206, 226 of the first and second cavities 202, 220 respectively.

The operation of the actuator 100 as shown in FIGS. 2A-2C will now be described.

In the stowed position, corresponding to FIGS. 1A and 2A, the drive member of the actuator will start to move the third member 150 in the direction of actuation 126. At this point the lock member 210 is held within the second cavity 220 of the lock system 200. As such, upon axial movement of the third member in this direction, the left side portion 226 of the second cavity 220 pushes against the adjacent radially outer chamfered edge 212 of the lock member 210.

In the stowed position, the lock member 210 cannot move inwardly due to the presence of the outer surface 114 of the first member 102. Therefore, the third member 150 drives the lock member 210 and, in turn, the second member 130, such that the second member 130 and the third member 150 move axially relative to the first member 102 in the direction of actuation 126.

During the first stage of actuation, the second chamber 136 will be reducing in volume, since the second seal 122 will be moving progressively closer towards the stationary first seal 120, driving the fluid previously contained in the second chamber 136 into the first chamber 106 via fluid passageways 108. This will compress the piston 110, building up potential energy in the resilient member 112 and hydraulic pressure within the first chamber 106.

Once the second member 130 and the third member 150 have moved a given distance, the actuator 100 will transition from the first stage of actuation to the second stage of actuation, which is illustrated in FIG. 2B (also corresponding to the example shown in FIG. 1B).

At this point, the second member 130 is prevented from further movement in the direction of arrow 126. For example, the catch 145 may attach or push against a fixed portion of the housing (e.g., static portion 22 in FIGS. 1A-1D), and/or the lock member 210 will move as described below.

The lock member 210 is now located radially outward of the first cavity 202, and further movement of the third member 150 in the direction of actuation 126 will cause the left side portion 226 of the second cavity 220 to push against the radially outer chamfered edge 212 of the lock member 210 which, in turn, causes the lock member 210 to move radially inwardly into the first cavity 202. The lock member 210 now sits at least partially within the first cavity 202 of the first member 102 (between the two angled side portions 206), and completely outside the second cavity 220 of the third member 150.

In this position, the second member 130 cannot substantially move relative to the first member 102, since axial movement of the second member 130 will cause the lock member 210 to abut one or other of the two angled side portions 206. The lock member 210 cannot move outwardly due to the presence of the inner surface 162 of the third member 150.

As such, further movement of the third member 150 in the direction of actuation causes it to slide relative to the second member 130 and the first member 102.

It should be noted that the lock member 210 may have a very limited amount of axial movement due to, e.g., tolerances in manufacture, but for the purposes of the present disclosure it should be assumed that during the second stage of actuation the second member 130 is substantially fixed axially with the first member 102.

At this transition, hydraulic pressure builds up in the first chamber 106, second chamber 136 and the third chamber 156. This build-up of pressure (or "preload") provides a force to the components of the actuator 100, in particular the lock member 210, second member 130 and third member 150. For example, the lock member 210 and the second member 130 are forced in the direction of arrow 178 (see FIG. 3), while the third member 150 is forced in the direction of arrow 179. This force or preload reduces the freedom of movement between the various components of the actuator 100 (in particular those mentioned above), which, in turn, reduces the vibration or flutter of the components of the actuator 100, as well as any components that the actuator 100 is connected to (e.g., a blocker door or cowl).

The build-up of pressure is also able to assist in moving the third member 150 relative to the second member 130 in the direction of actuation 126. As the third member 150 continues to move, the piston 110 and resilient member 112 will decompress, causing the fluid within the first chamber to transfer to the third chamber 156 via (in turn) the fluid passages 108, the second chamber 136 (which is at a minimum volume) and the fluid passages 138.

As such, and in accordance with the disclosure, at this transition there will be maximum hydraulic pressure, tightening up the components, as well as, optionally a sudden increase in driving force for the actuator through the use of the additional hydraulic drive provided by the piston 110 and resilient member 112 described above, with the various fluid passages and chambers of the first, second and third members.

During the second stage of actuation, as shown in FIG. 2C (and FIG. 1C), the third member 150 will continue to be driven in the direction of actuation 126. The volume of the third chamber 156 will increase as it fills up with the fluid from the first chamber 106. The actuator arm 101 forms part of the third member 150 and will continue to move in the direction of actuation to further actuate a component connected thereto (e.g., the blocker door 32 as shown in FIGS. 1C and 1D). The hydraulic pressure and/or driving force provided by the piston 110 will gradually decrease as the third member 150 moves in the direction of actuation 126, due to the fact that the force exerted by the resilient member 112 decreases as it decompresses.

To retract the thrust reverser, the actuator 100 is operated in reverse.

That is, the third member 150 is driven in a reverse direction (i.e., opposite to the direction of actuation 126) until the second cavity 220 is positioned radially outward of the lock member 210. At this point, the fluid pressure will have built up again in the first chamber 106, resulting again in maximum hydraulic pressure and causing a force to be exerted on the second member 130 in a direction opposite to the direction of actuation 126. This causes the radially inner chamfered edge 214 of the lock member 210 to ride up the left chamfered edge 206 of the first cavity 202, forcing the lock member 210 completely out of the first cavity 202 and at least partially into the second cavity 220. This means that the lock member 210 will be held within the second cavity 220, preventing any substantial relative movement between the second member 130 and the third member 150, such that they move together in the direction of retraction until the actuator 100 is fully retracted as shown in FIGS. 1A and 2A.

The broadest aspects of the disclosed technology propose an arrangement involving the phased actuation of two moving actuator members (e.g., the second and third members 130, 150) relative to a stationary member (e.g., the first member 102). The sequence of actuation is controlled by the lock system 200 which is configured to selectively lock a first of the moving members to the other of the moving members in a first stage of actuation, and then lock the stationary member to the first moving member in a second, separate stage of actuation. This provides two distinct stages of actuation with a single input drive.

In various embodiments the lock system 200 involves grooves (e.g., the cavities 202, 220) being positioned to control the relative movement of the first, second and third members 102, 130, 150.

In various embodiments, a purpose of the hydraulic/compression system may be to provide a controlled preload at the transition between the first and second stages of actuation, which has been found to limit aerodynamic flutter of the various components of the actuator and apparatus (e.g., the blocker doors 32).

The use of a hydraulic fluid located in the chambers formed between the first, second and third members 102, 130, 150 also helps to ensure sufficient lubrication between the first, second and third members 102, 130, 150 as they move relative to each other.

The actuator may be pre-pressurised and sealed. Minimum hydraulic pressure would typically be generated in the stowed position, which may optimise sealing capability in the dormant position (which will be the rest or usual position of the actuator). Maximum hydraulic pressure and segment lock preload would is at the transition between the first stage and second stage of actuation. However, this maximum hydraulic pressure may only be felt for a limited period of time, since the actuator may quickly deploy through the second stage such that the hydraulic pressure reduces gradually.

In various embodiments the disclosed technology allows sequencing of the actuator members (i.e., the second and third members 130 and 150) with a single main mechanical drive, assisted by the hydraulic system in the second stage of actuation. In other words, the disclosed arrangement relates to a single input (e.g., using a ballscrew) with a dual-stage output, i.e., a first driving force provided by the mechanical actuator, and a second driving force provided by the hydraulic system including the spring 112, piston 110 and hydraulic fluid. As discussed above, the disclosed technology ensures that during movements that have the highest potential for flutter (i.e., between the first and second actuator stages), no motion is lost (or energy loss is reduced) under aerodynamic loading due to the preload of the hydraulic system during the transition.

Although the present invention has been described with reference to preferred embodiments, it will be understood by those skilled in the art that various changes in form and detail may be made without departing from the scope of the invention as set forth in the accompanying claims.

For example, the lock system described above is one example of a suitable locking system that may be used, but any suitable lock system could be used to provide the functional features of the broadest aspects of the disclosure, namely a lock system capable of switching between locking the second member to the third member during the first stage of actuation, and then releasing the second member from the third member and locking the first member to the second member during the second stage of actuation.

In various embodiments it is envisaged that the principles of the present disclosure may be used with any type of stored energy device, and are not limited (for example) to the use of a piston and resilient member as disclosed in the example above. For example, a compressed gas canister could be used to provide the controlled preload at the transition between the first stage of actuation and the second stage of actuation, and the additional driving force during the second stage of actuation.

The actuator described above may be any type of actuator incorporating the essential features disclosed herein, and an apparatus utilising the actuator does not necessarily need to be a thrust reverser. The problem of vibrations or flutter at the transition between the first and second stage of actuation is not limited to the use of a blocker door, for example. In various embodiments, the actuator described herein may be used to actuate other aircraft components, in particular those found in the engine nacelle. For example, the actuator may be used to actuate a Variable Area Fan Nozzle ("VAFN"), such as a VAFN or other engine nacelle component having two cowls, where a first stage of actuation moves a first of the two cowls, and a second stage of actuation moves a second of the two cowls.

The invention claimed is:

1. An actuator for an aircraft thrust reverser, comprising:
   a first member;
   a second member movable relative to the first member;
   a third member movable relative to the first member and the second member;
   a stored energy device; and
   a lock system configured to selectively lock the second member to the third member in a first stage of actuation, and the first member to the second member in a second, separate stage of actuation;
   wherein relative movement of the second member and the third member with respect to the first member in the first stage of actuation increases the energy within the stored energy device; and
   wherein the stored energy device is configured to exert a force on the second member and the third member, wherein the force exerted by the stored energy device is dependent on the position of at least one of the second member and the third member with respect to the first member during the first and second stages of actuation.

2. An actuator as claimed in claim 1, wherein in the first stage of actuation the second member and the third member are locked together by the lock system, such that the second member and the third member are able to move relative to the first member.

3. An actuator as claimed in claim 1, wherein in the second stage of actuation the first member and the second member are locked together by the lock system, and the second member is released from the third member, such that the third member is able to move relative to the first member and the second member.

4. An actuator as claimed in claim 1, wherein during the first stage of actuation the energy stored within the stored energy device gradually increases, and during the second stage of actuation the energy within the stored energy device gradually decreases, such that at the transition between the first stage of actuation and the second stage of actuation the energy within the stored energy device is at a maximum value.

5. An actuator as claimed in claim 4, wherein the stored energy device comprises a resilient member, and during the first stage of actuation the resilient member is compressed to increase the energy within the resilient member, and during the second stage of actuation the resilient member is decompressed to decrease the energy within the resilient member.

6. An actuator as claimed in claim 1, further comprising a further actuator configured to drive the third member in a direction of actuation throughout the first stage of actuation and a second stage of actuation.

7. An aircraft thrust reverser comprising an actuator as claimed in claim 1, wherein the actuator is configured to control deployment of the thrust reverser.

8. An aircraft thrust reverser as claimed in claim 7, further comprising:

a set of cascade vanes; a translating cowl; and
a blocker door, wherein the actuator is configured to translate the translating cowl to expose the cascade vanes to an airflow during the first stage of actuation, and then move the blocker door into the path of the airflow during the second stage of actuation.

9. An aircraft thrust reverser as claimed in claim 8, wherein at a transition between the first stage of actuation and the second stage of actuation the blocker door begins to move into the path of the airflow.

10. An actuator for an aircraft thrust reverser, comprising:
    a first member;
    a second member movable relative to the first member;
    a third member movable relative to the first member and the second member;
    a stored energy device; and
    a lock system configured to selectively lock the second member to the third member in a first stage of actuation, and the first member to the second member in a second, separate stage of actuation;
    wherein relative movement of at least one of the second member and the third member with respect to the first member in the first stage of actuation increases the energy within a stored energy device;
    the first member comprises a first fluid chamber and is configured such that an increase in fluid pressure within the first fluid chamber increases the energy within the stored energy device;
    the second member comprises a second fluid chamber in fluid communication with the first fluid chamber; and
    during the first stage of actuation relative movement of the second member with respect to the first member forces fluid from the second fluid chamber into the first fluid chamber to increase the energy within the stored energy device.

11. An actuator as claimed in claim 10, wherein the third member comprises a third fluid chamber, and during the second stage of actuation the stored energy device is configured to force a fluid into the third fluid chamber to decrease the energy within the stored energy device.

12. An actuator as claimed in claim 10, further comprising a lubricating fluid held within and transferred between the first fluid chamber, second fluid chamber and third fluid chamber during the first and second stages of actuation, wherein the lubricating fluid is configured to lubricate the first member, the second member and the third member.

13. A method of operating an actuator for a thrust reverser, comprising:
    providing a stationary member and two moving members, wherein the moving members are located concentrically around the stationary member and are movable relative to each other and the stationary member;
    providing a lock system configured to lock the moving members to each other in a first stage of actuation, and then to lock one of the moving members to the stationary member, and unlock the moving members from each other in a second, separate stage of actuation;
    driving the moving members relative to the stationary member in the first stage of actuation; and then
    driving the other of the moving members relative to the second member and the stationary member in the second stage of actuation
    wherein relative movement of at least one of the moving members with respect to the stationary member in the first stage of actuation increases the energy within a stored energy device; and wherein the stored energy device is exerts a force on the two moving members, wherein the force exerted by the stored energy device is dependent on the position of at least one of the moving members with respect to the stationary member during the first and second stages of actuation.

* * * * *